July 28, 1959  O. L. WETZEL  2,896,878
KITE STRING REEL
Filed Jan. 8, 1954
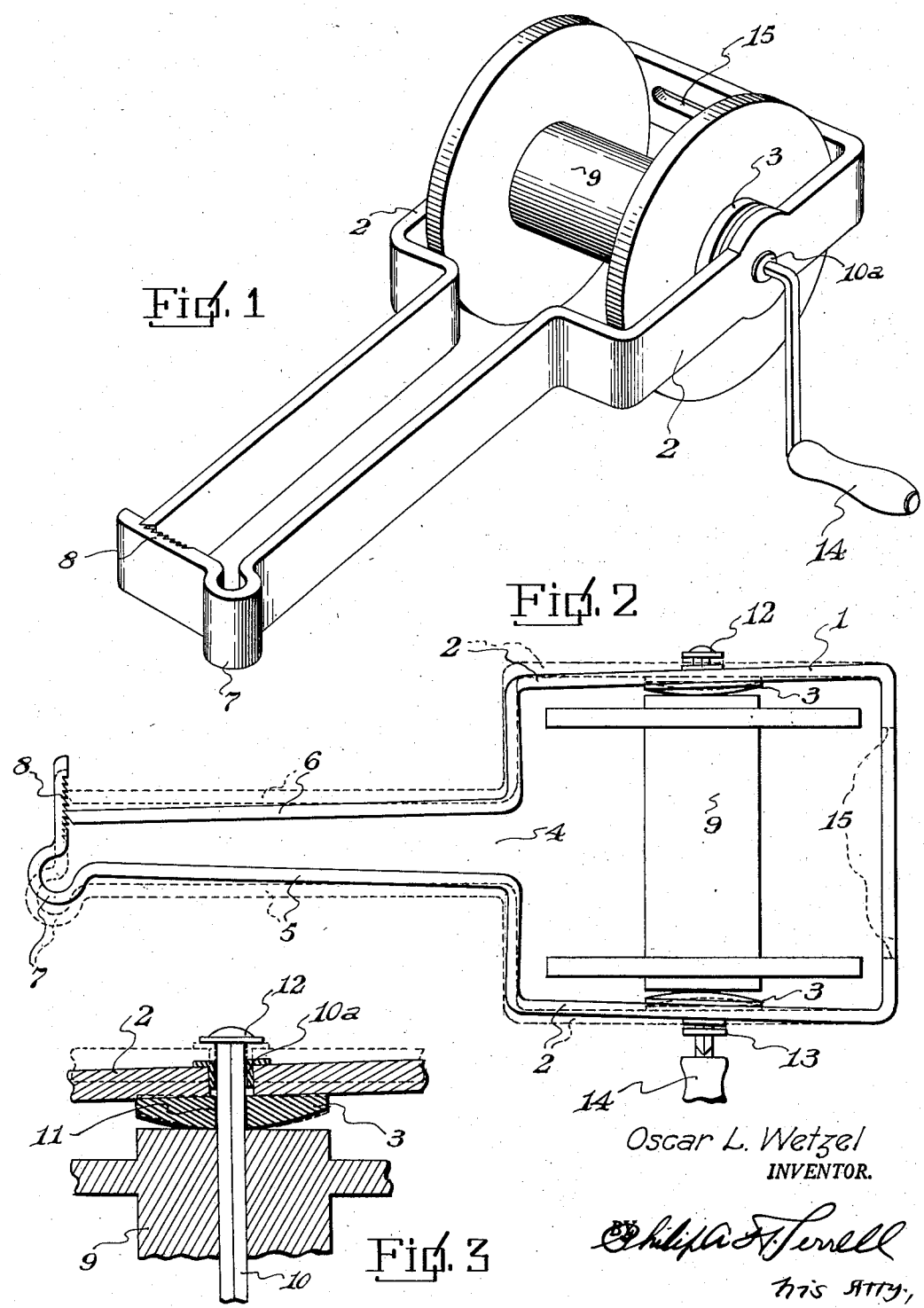
Oscar L. Wetzel
INVENTOR.

United States Patent Office 2,896,878
Patented July 28, 1959

2,896,878

KITE STRING REEL

Oscar L. Wetzel, Tulsa, Okla.

Application January 8, 1954, Serial No. 403,028

1 Claim. (Cl. 242—99)

The invention relates to kite string reels and has for its object to provide a string reel, mounted in a frame, the main portion of which is rectangular shaped and which rectangular portion terminates in spaced spring members, forming a handle adapted to be grasped by the operator during a winding and unwinding operation. The handle being squeezed for a braking operation, on opposite ends of the reel for controlling the speed of unreeling.

A further object is to interpose disc shaped convex members between the ends of the reel and the arms of the spring frame, the convex sides of said convex members cooperating with the ends of the reel, for a braking operation, even when the opposite sides of the rectangular spring frame are out of parallelism.

A further object is to provide a ratchet connection between the ends of the handle arms so that the braking action, on the reel ends, may be regulated.

With the above and other objects in view the invention resides in the combination and arrangement of parts as set forth, shown in the drawing, described and claimed, it being understood that changes in the precise embodiment of the invention may be made, within the scope of what is claimed, without departing from the spirit of the invention.

In the drawing:

Figure 1 is a perspective view of the reel and holder.

Figure 2 is a top plan view of the reel and holder, showing the frictional braking position of parts in dotted lines.

Figure 3 is a horizontal sectional view through one end of the reel and the adjacent frame arm.

Referring to the drawing the numeral 1, designates a rectangular shaped reel holding frame formed from spring material and 2 the side arms thereof. Arms 2 are adapted to be sprung inwardly towards each other for the braking operation, against the convex washers interposed between the side arms 2, of the frame and the ends of the kite cord reel. The rear side of the rectangular frame is split as shown at 4 in Figure 2 and terminates in spaced handle arms 5 and 6 adapted to be gripped and forced together for a braking operation. Arm 5, terminates in a spring loop 7 and a transverse toothed portion 8, with the teeth of which the end of the other arm 6 cooperates for locking the braking action. It will be seen that when the arms 5 and 6 are forced together, the flat surface of the convex discs 3 will be forced into frictional engagement with the frame arms while the curved surface will rock against the end of the reel hub, and that the paying out of the cord from the reel can be governed and regulated according to kite flying conditions.

Reel 9 is mounted on a square shaft 10 and the ends of said shaft are rotatively mounted in bearings in the form of bushings 10a in the spaced arm members of the frame 1. It will be noted that the shaft ends have a rocking movement in the bushings, therefore it will be seen that the frame side arms 2 will not bind on the shaft ends during a braking operation and at which time the arms 2 are out of parallelism, as clearly shown in Figure 3. The shaft 10 also rotates the convex washers 3 and incident to the oversize squared openings 11 therethrough, it will be seen that the braking action will not be restricted by binding of the parts.

Outward movement of each of the arms 2, is limited by the headed member 12 carried by one end of the shaft 10 and the flange 13 carried by the other end of said shaft. Shaft 10 is also provided with a conventional crank 14 adapted to be rotated by the operator for rotating the reel 9 for a winding operation.

A transverse slot 15, parallel to the axis of the reel, receives the kite string and allows it to travel from side to side as it winds onto the reel or is paid out from the reel.

From the above it will be seen that a cord reeling device is provided, which is particularly adapted for use by kite fliers and by means of which the amount of cord fed out may be positively controlled and regulated, through its braking operation, by simply squeezing the handle members 5 and 6 towards each other. It will also be seen that the device is simple in construction and that the parts have been reduced to a minimum.

The invention having been set forth, what is claimed as new and useful is:

A flexible element reeling device comprising a U-shaped frame of inherently resilient material including opposing arms and a transverse web connecting adjoining ends of the arms, a reel having opposing ends, means rotatably mounting the reel transversely between the arms with the ends thereof confronting the inner surfaces of the arms, said arms having axially extending ends projecting beyond the reel and movable toward and away from each other, one of said ends having an inturned, lateral end portion provided with an inner toothed surface and having a spring loop connecting the lateral end portion to the arm and the other end terminating in a tooth end terminal disposed substantially at right angles to the toothed surface and lockingly engageable selectively with the toothed surface which is biased by the spring loop into engagement with the terminal to hold the arms in adjustable clamping relation with the ends of the reel for braking the reel against rotation.

References Cited in the file of this patent

UNITED STATES PATENTS

| | | |
|---|---|---|
| 654,497 | Thomas | July 24, 1900 |
| 875,492 | Bauman | Dec. 31, 1907 |
| 938,388 | Kerrigan | Oct. 26, 1909 |
| 1,067,643 | Christner et al. | July 15, 1913 |
| 1,982,042 | Basler | Nov. 27, 1934 |
| 2,031,501 | Porter | Feb. 18, 1936 |
| 2,284,375 | De Board | May 26, 1942 |